(12) United States Patent
Panz et al.

(10) Patent No.: US 7,074,457 B2
(45) Date of Patent: Jul. 11, 2006

(54) PROCESS FOR PREPARING HIGH-WHITENESS HYDROPHOBIC PRECIPITATED SILICA WITH ULTRALOW MOISTURE ABSORPTION

(75) Inventors: Christian Panz, Wesseling (DE); Karl Meier, Alfter (DE); Ralf Stoffels, Erftstadt (DE); Helga Obladen, Brühl (DE); Ralf Schmoll, Bonn (DE)

(73) Assignee: Degussa AG, Duesseldorf (DE)

( * ) Notice: Subject to any disclaimer, the term of this patent is extended or adjusted under 35 U.S.C. 154(b) by 265 days.

(21) Appl. No.: 10/211,267

(22) Filed: Aug. 5, 2002

(65) Prior Publication Data

US 2003/0130379 A1 Jul. 10, 2003

(30) Foreign Application Priority Data

Aug. 4, 2001 (DE) ................ 101 38 491

(51) Int. Cl.
*B05D 7/24* (2006.01)
(52) U.S. Cl. .............. 427/220; 106/490; 423/335; 423/338
(58) Field of Classification Search .......... 427/220; 106/490; 423/335, 338
See application file for complete search history.

(56) References Cited

U.S. PATENT DOCUMENTS

| | | | |
|---|---|---|---|
| 3,085,905 A | | 4/1963 | Prevot et al. |
| 3,334,062 A | | 8/1967 | Brown et al. |
| 3,830,738 A | | 8/1974 | Cottrell et al. |
| 3,920,865 A | * | 11/1975 | Laufer et al. ............. 427/220 |
| 4,072,796 A | * | 2/1978 | Reinhardt et al. ......... 428/405 |
| 4,273,589 A | * | 6/1981 | Nauroth et al. ........... 524/493 |
| 4,344,858 A | | 8/1982 | Zucker et al. |
| 4,377,493 A | | 3/1983 | Boylan et al. |
| 4,849,022 A | * | 7/1989 | Kobayashi et al. ........ 106/490 |
| 5,034,207 A | * | 7/1991 | Kerner et al. ............. 423/339 |
| 5,859,117 A | * | 1/1999 | Goerl et al. .............. 524/493 |
| 5,959,005 A | | 9/1999 | Hartmann et al. |
| 6,020,395 A | * | 2/2000 | Angeletakis .............. 523/116 |
| 6,191,122 B1 | * | 2/2001 | Lux et al. ................. 514/122 |
| 6,197,384 B1 | | 3/2001 | Schubert et al. |
| 6,239,243 B1 | * | 5/2001 | Deng et al. ................. 528/12 |

FOREIGN PATENT DOCUMENTS

| | | |
|---|---|---|
| DE | 2 628 975 | 12/1971 |
| DE | 2 242 728 | 3/1974 |
| DE | 2 435 860 | 2/1976 |
| DE | 24 35 860 | 2/1976 |
| DE | 2 513 608 | 10/1976 |
| DE | 25 13 608 | 10/1976 |
| DE | 26 28 975 | 12/1977 |
| DE | 2 729 244 | 1/1979 |
| DE | 27 29 244 | 1/1979 |
| DE | 2 829 906 | 3/1979 |
| DE | 28 29 906 | 3/1979 |
| DE | 3 411 759 | 4/1985 |
| DE | 34 11 759 | 4/1985 |
| EP | 0 340 129 | 11/1989 |
| EP | 0 367 934 | 5/1990 |
| EP | 0 808 880 | 11/1997 |
| GB | 813453 | 5/1959 |
| WO | WO 95/05880 | 3/1995 |
| WO | WO 01/12731 | 2/2001 |

OTHER PUBLICATIONS

Ullmann's Encyclopedia of Industrial Chemistry On-line "Fluidized-Bed Reactors; Introduction", 2005.*
XP000121954, 6001 Chemical Abstracts, 114(1991) Apr. 8, No. 14, Columbus, OH, US.
Ullmann's Encyclopedia of Industrial Chemistry, 5th, Completely Revised Edition, vol. A23, B. Elvers et al., pp. 628-647.

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A hydrophobic precipitated silica is prepared by a process comprising:
  a) preparing a mixture of an organopolysiloxane derivative and a precipitated silica;
  b) conditioning the mixture obtained at a temperature ranging from 10 to 150° C. for a period ranging from 0.5 to 72 h, and
  c) conducting oxidative heat treatment under fluid conditions at a temperature more than 300° C. with an oxidizing gas.

26 Claims, 2 Drawing Sheets

PROCESS FOR PREPARING HIGH-WHITENESS HYDROPHOBIC PRECIPITATED SILICA WITH ULTRALOW MOISTURE ABSORPTION

BACKGROUND OF THE INVENTION

1. Field of the Invention

The present invention relates to a process for preparing a hydrophobic precipitated silica featuring extremely low water absorption, a high level of whiteness, and properties of low thickening in silicone rubber formulations with a high reinforcing action in the silicone vulcanizates.

2. Description of the Background

The treatment of finely divided solids, metal oxides, and silicates with organosilicon compounds, such as organopolysiloxanes, is known, for example, as disclosed in DE 30 85 905. The process involves a heat treatment process which is conducted under an inert atmosphere of nitrogen. Additionally, hydrophobic silicates are known, for example, as described in DE 24 35 860, DE 22 42 728, and DE 25 13 608.

In these documents, hydrophilic silicates and precipitated silicas are hydrophobicized by reacting them with organosilicon compounds. Examples of hydrophobicizers used include organohalosilanes and organopolysiloxane compounds.

DE 26 28 975 and DE 27 29 244 describe preparing hydrophobic silicas by reacting a hydrophilic precipitated silica featuring low water absorbency with silicone oil or dimethyldichlorosilane, respectively. In the process described in DE 26 28 975, the reaction is conducted with the hydrophobicizer (silicone oil) being added to the dry precipitated silica. In the process described in DE 27 29 244, the hydrophobicizer (dimethyldichlorosilane) is introduced directly into the precipitated silica suspension. In both cases, the hydrophobicizing step is followed by heat treatment at elevated temperatures, specifically ranging from 200 to 400° C.

A disadvantage of this process is that the precipitated silica thus hydrophobicized becomes discolored at the required process temperatures. The discoloration of this silica is particularly inconvenient when it is added to silicone formulations; that is, when these hydrophobic precipitated silicas are added to silicone rubber formulations or to defoamer mixtures based on silicone oil.

As a measure of the discoloration it is possible to employ the value known as reflectance. In measuring the reflectance of hydrophobic precipitated silica, the diffuse reflection power of a sample is investigated. The higher the diffuse reflection power of a sample, the higher its reflectance and thus the higher the whiteness of the sample.

Precipitated silicas generally have a reflectance of not more than 97%. (In this regard, an object of the present invention is to hydrophobicize silicas in such a way that, ideally, the reflectance of the original silica is retained.) Discoloration occurs, in particular, when the precipitated silicas are strongly hydrophobicized; that is, have a high methanol wettability and high carbon loadings It is precisely these properties, however, which are in many cases (in silicone rubber formulations, for example) desired.

A further disadvantage of the known processes is that only a limited amount of hydrophobicizer can be attached covalently to the silica. Particularly in silicone rubber formulations, however, high carbon loadings are desired, since they permit decisive improvements in the rheological properties, such as the thickening, i.e., low yield point and low viscosity, of the compounds.

As a measure of the thickening of the treated silica, it is convenient to use what is termed the DBP number. The DBP number indicates the absorption capacity of a silica for DBP. The measurement technique shows the amount of dibutyl phthalate, in grams, on a sample of 100 g, at which a massive increase in force in the compounder is observed.

It is also not possible to achieve high carbon loadings by using diorganodichlorosilanes, or hydrolysis products of diorganodichlorosilanes, or with corresponding diorganopolysiloxanes in excess to the silanol groups present, because the totality of the organosilicon compounds is no longer attached covalently to the silica. In hydrophobicized silicas for fractions of hydrophobicizing agent that have not been covalently attached, there is a risk that these molecules may have a marked mobility, which in many applications can be very detrimental (e.g., in silicone rubber applications for medical purposes or for articles that are safe in food contact, such as pacifiers, etc.).

A further disadvantage of the prior art processes is that the relatively low carbon contents of less than 3.1% lead to hydrophobic silicas which have a strong thickening action in silicone rubber formulations. DE 26 28 975 lists data on the testing of hydrophobic precipitated silica in silicone rubber formulations, in which the hydrophobic precipitated silica is used in increasing weight fractions. From these data it is clear that, at a level of just 15% of hydrophobic silica in the rubber, the self-leveling properties of the silica disappear and that, at 20%, flowable compounds are no longer obtained. All tables clearly indicate that all of the mechanical properties are improved as the filler content goes up. It would therefore be desirable to prepare silicone rubber formulations which include high fractions of hydrophobic silicas, for improving the mechanical properties, but which at the same time are still flowable.

SUMMARY OF THE INVENTION

Accordingly, one object of the present invention is to provide a process for preparing a hydrophobic precipitated silica which has a high, covalently attached carbon loading, low water absorption, a low-thickening effect with good reinforcer properties in silicone rubber formulations, and a high level of whiteness.

Briefly, this object and other objects of the present invention as hereinafter will become more readily apparent can be attained by a process of preparing a hydrophobic silica which has the required properties by:

a) preparing a mixture of an organopolysiloxane compound and a precipitated silica, b) conditioning the mixture at a temperature ranging from 10 to 150° C. for a period of time ranging from 0.5 to 72 h, and c) conducting oxidative heat treatment under fluid conditions at a temperature more than 300° C. with an oxidizing gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
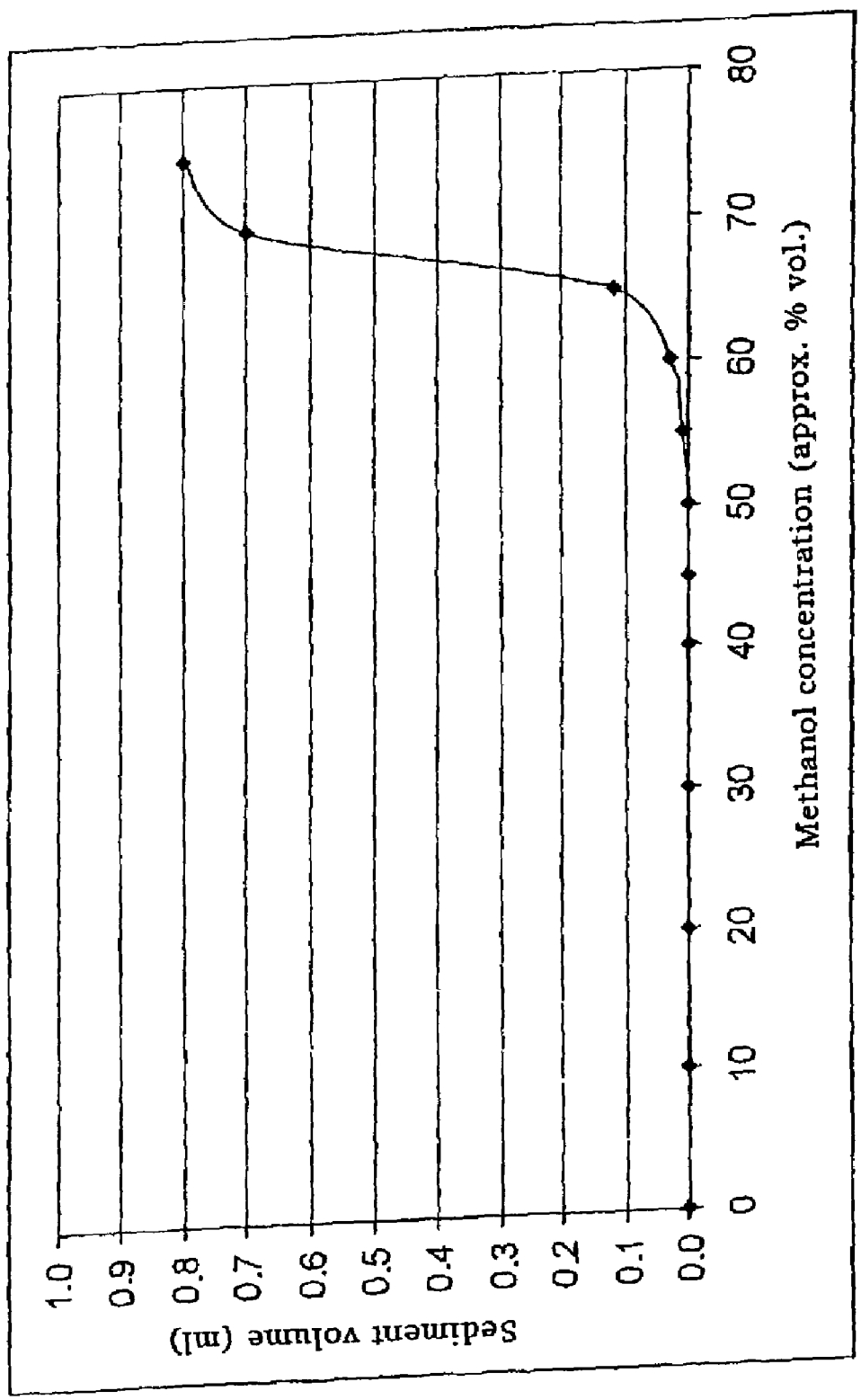
FIG. 1 shows the methanol wettability of a hydrophobicized silica of the present invention.

The process of the invention is suitable for use on the industrial scale; that is, it consistently yields reproducible hydrophobicization results in producing a silica of a high whiteness, and is capable of being conducted both continuously and in a batchwise manner. The present process distributes a polysiloxane on a hydrophilic silica with subsequent conditioning and an oxidative heat treatment in, for example, a fluidized bed reactor.

Conditioning of the treated silica is preferably conducted by means of a heat treatment at a temperature ranging from 100 to 150° C. over a period of time ranging from 0.5 to 2 h and/or at a temperature ranging from 50 to 80° C. for a period of time ranging from 15 to 30 h. It is likewise possible to store the treated silica at room temperature, i.e., approximately 20° C. for at least 48 h.

The hydrophobic precipitated silica prepared by the process of the invention has the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m²/g |
| CTAB surface area | >30 m²/g |
| water vapor absorption at 30° C. and 30 AH* | 1.1 ± 0.2% |
| water vapor absorption at 30° C. and 70 AH* | 1.4 ± 0.3% |

*AH = ambient humidity

The ranges of preference specified may be adjusted independently of one another.

The hydrophobic silicas of the invention may additionally, each independently of one another, be characterized by the following properties:

| | |
|---|---|
| Sears number | <1.6 |
| pH | 5–9 |
| water content | <2% |
| conductivity | <150 μS |
| loss on ignition | >3% |

The conductivities of the treated silicas may be below 100, 60, 30, or even 20 μS.

The process provides a silica which:
has an extremely high whiteness (reflectance above 94%),
exhibits no discoloration in air even at temperatures above 300° C.,
has an extremely low moisture absorption, at the same level as pyrogenic silicas,
has a highly homogeneous hydrophobicization, i.e., a steep methanol wettability curve,
has a high methanol wettability (>60%),
has a high level of firmly attached carbon (>3.1%),
exhibits a low thickening action in silicone rubber,
contains virtually no ionic impurities, i.e., low conductivity <150 μS, and
contains no surfactants, emulsifiers or organic solvents which might lead to discoloration at elevated temperatures.

The process for preparing the silica of the invention makes it possible to achieve homogeneous distribution of the hydrophobicizer on the silica while avoiding the use of solvents (except for water), emulsifiers, surfactants or other surface-active agents in the hydrophobicizer, so that the resulting silica combines low-thickening properties with the absence of discoloration.

The effective distribution of the hydrophobicizer and the high degree of hydrophobicization of the precipitated silica of the invention result in silicone rubber formulations, for example, of very low thickening, which is unimpaired even by prolonged storage, in conjunction with good mechanical and optical properties in the vulcanizates.

Figure 2:
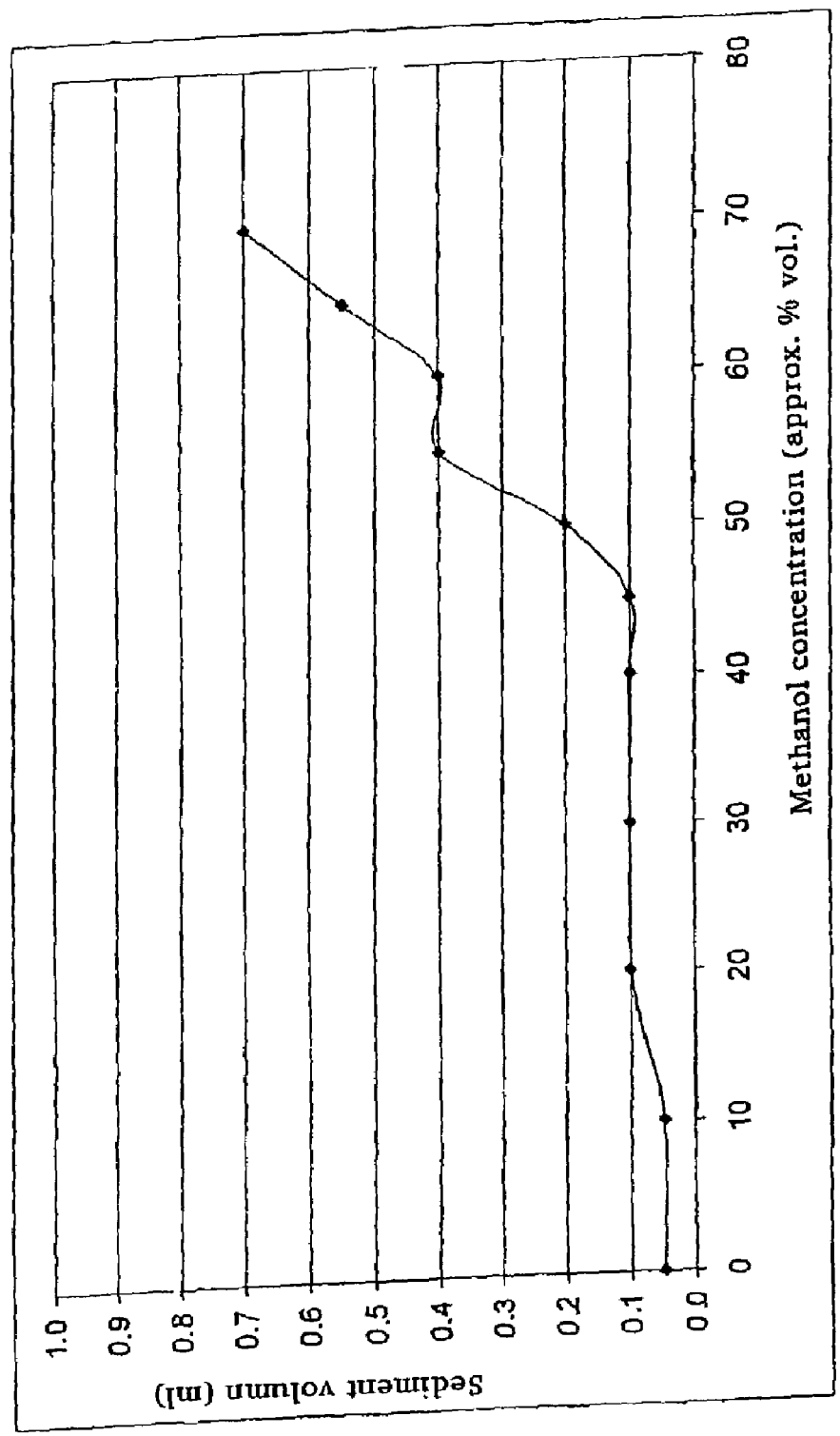
FIG. 2 shows the methanol wettability of a conventional hydrophobicized silica which has not been heat treated.

Silicas of the invention exhibit a steep methanol wettability; in other words, they undergo homogeneous hydrophobicization (FIG. 1). FIG. 2 shows the methanol wettability of customary hydrophobic silicas heat-treated without the conditioning of the invention. The silica of the invention is preferably prepared with a polysiloxane, so that after heat treatment its only organic radicals are methyl groups, this going hand-in-hand with a very high thermal load-bearing capacity (>300° C.). The ingress of air during treatment does not lead to discoloration of the product.

The process of the invention makes it possible to effect hydrophobicization, particularly of silicas with a low silanol group density. (The measure which indicates the amount of silanol groups is the Sears number, i.e., the alkali consumption of an acid-based titration. Together with the BET surface area it is then possible to compare silanol group densities relatively.) The present process makes it possible to achieve a high whiteness (>94% reflectance) in the resulting silica of the invention.

The water absorption of the hydrophobic precipitated silica of the invention, which is very low for a precipitated silica, is made possible by the selection of a hydrophilic precipitated silica with a very low silanol group density and through very homogeneous hydrophobicization with organosilicon compounds. The measure used for the silanol group density is the Sears number in proportion to the BET surface area.

The reaction conditions employed in the process of the invention do not lead to carbonization and thus lead to virtually no discoloration of the product. For this reason it is important that the hydrophilic base silica contains no organic impurities, since otherwise discoloration of the product increases. Since the cleavage products which form as a result of the heat treatment, and which are gaseous under the process conditions, may bring about a certain degree of discoloration even in an oxidizing atmosphere, it is important to remove these cleavage products from the product by means of a sufficient throughput of gas.

The use of liquid polysiloxane, preferably polydimethylsiloxane of preferably 30–100 cSt, permits optimum distribution on the base silica. Under the oxidative reaction conditions, the polydimethylsiloxanes used are able to undergo resinification. This has the great advantage that the hydrophobicizer can be distributed on the silica in liquid form and then fixed. The amount of bound carbon can be greatly increased by the oxidative heat treatment.

High carbon loadings and high methanol wettabilities bring about decisive improvements in the properties of silicas in silicone rubber formulations. Further reduction in moisture absorbency permits the vulcanization of rubber at atmospheric pressure and at temperatures above 100° C. in silicone rubber formulations, since no disruptive vapor bubbles appear in the vulcanizate. The high carbon content silicas exhibit substantially improved Theological properties in silicone rubber formulations; that is, they have only a low thickening action, and exhibit low yield points. This low thickening action makes it possible to prepare flowable silicone rubber formulations which are filled with well above 20% of hydrophobic precipitated silica and yet can still be processed by injection molding. Additionally, the higher filling level of treated silica leads to markedly improved mechanical properties in the vulcanizates.

The hydrophobic precipitated silica prepared by the process of the invention may therefore be used in the following applications:

1. As a Filler in Silicone Rubber Formulations.

The silica of the invention can be used without further hydrophobicization in all types of silicone rubber. The low water absorption suppresses evolution of vapor in high temperature crosslinking systems such as LSR and HTV silicone rubber, and allows pore-free vulcanizates. The low DBP number leads to low compound viscosities, which can be used to advantage in LSR and RTV2 compounds. The compounds possess a high level of stability on storage; that is, the phenomenon referred to as after stiffening is suppressed. Because of the low moisture absorption, the silica of the invention can also be used in systems which cure by atmospheric humidity such as RTV1 compounds. The compounds likewise have a high level of stability on storage. Since the moisture content of the silica of the invention is greatly reduced, undesired hardening during storage is suppressed.

Because of the high whiteness of the silica, attractive white vulcanizates can be produced. The low water absorption of the silica results in low moisture absorption in the vulcanizates. This produces high electrical resistance and an increase in aging stability, especially at high temperatures. These properties are particularly useful in electrical insulators and in seals.

2. As a Defoamer Component.

DE 28 29 906, U.S. Pat. No. 4,377,493, DE 34 11 759, U.S. Pat. No. 4,344,858, and WO 95/05880 teach that hydrophobicized silicas can be used in defoamer formulations. Advantageous for high-level defoamer performance here are the high hydrophobicity and a high surface area, readily accessible even to relatively large molecules, of the silica prepared by the procedure of the invention. The high hydrophobicity of the silica of the invention, furthermore, ensures high alkali resistance and results in much higher service lives particularly in strongly alkaline media.

The high reflectances of the silicas ensure appealing defoamer formulations free from discoloration, particularly in formulations based on mineral oil and silicone oil.

3. As a Free-flow Agent.

It is known (for example, as disclosed in Degussa AG brochure series, Fallungskieselsauren und Silikate [Precipitated silicas and silicates], 1984) that hydrophobicized silicas can be used as free-flow auxiliaries. Because of its low water absorption, the silica prepared by the process of the present invention is particularly suitable as a free-flow auxiliary for substances that are sensitive to hydrolysis. Here again, the high reflectances of the silicas of the invention are an additional advantage.

The silica of the invention may also be used as a carrier substance, particularly for insecticides, as an insecticide per se, as an antiblocking auxiliary, or as a filler in silicone rubber mixtures which cure by atmospheric humidity.

The hydrophobic precipitated silicas are prepared in three steps:

First, a liquid polysiloxane derivative is initially distributed, physically, on the silica surface. When this initial distribution is conducted in aqueous media, i.e., suspensions or silica having a water content of more than 70%, the silica is typically unstable. It must therefore be isolated quickly by filtration following the initial distribution, and/or subjected to short term drying (in a spin-flash drier or nozzle tower drier, for example). This conserves the distribution of the organopolysiloxane droplets on the silica and prevents separation into water, silicone oil, and silica.

Subsequently, in a controlled conditioning step—process step b)—the distribution of the hydrophobicizer is improved further and engagement of the polysiloxane derivative with the silica surface is achieved. This state of distribution is stable even in aqueous media. Following process step b), there is no longer any separation between the polysiloxane derivative and the silica. At carbon contents $\geq 3.1$, the conditioned silicas can be adjusted steplessly to a methanol wettability of up to 55%. The BET/CTAB ratio after this step is <1. The binding of the polysiloxane to the silica is thought to be a result of the formation of multiple hydrogen bonds between the siloxane bridges of the polysiloxane molecules and the silanol groups on the silica surface.

The conditioning step is followed by a heat treatment in an oxidizing atmosphere, which suppresses discoloration, ensures covalent binding of the hydrophobicizing agent, and probably as a result of the formation of gaseous cracked products—increases further the distribution of the hydrophobicizer on the silica. Heat treated silicas, with a lower carbon content than the corresponding conditioned silica, have a higher methanol wettability. Heat treatment in an oxidizing atmosphere assists the resinification of the polysiloxanes, so that much larger amounts of hydrophobicizer can be anchored covalently on the silica. The BET/CTAB ratio has turned around and is now >1.

As the organopolysiloxane compound of the invention, it is possible to use any organosilane or organohalosilane which is commonly used to hydrophobicize precipitated silicas.

Step a) of the process of the invention can be conducted with the following variants:

Addition of organopolysiloxane compound to a precipitated silica having a water content ranging from 1 to 80% by weight, preferably from 20 to 60% by weight.

Addition of the organopolysiloxane compound to a dispersion of the precipitated silica, i.e., following precipitation of silicate with an acid, for example, using a Rhein-Hütte mixer or Kotthof-Mischsirene or Ultra-Turrax. This necessitates rapid filtration and/or accelerated drying after the reaction.

Addition of the organopolysiloxane compound to a precipitated silica having a water content ranging from 70 to 99% by weight, with subsequent isolation of the solid from the water. Isolation can be effected by filtration, nozzle tower, spin-flash, or other short term drying. The higher the water content, the more quickly isolation of the solid should be conducted. Separation should be avoided.

Simultaneous supplying of the precipitated silica or hydrous silica and the organopolysiloxane derivative to a spin-flash drier.

Mixing of dry precipitated silica with polysiloxane, in a Gericke mixer, for example.

An alternative possibility is first to prepare a masterbatch, i.e., a conditioned precipitated silica, prepared by process steps a) and b), and then mixing the conditioned silica with a (hydrophilic), hydrous precipitated silica, e.g., filtercakes, silica suspensions or silica dispersions.

The water content of the hydrophilic precipitated silica may vary within the ranges mentioned above.

The base silica may be coated in a weight ratio, for example, ranging from 1:1 to 1:3 with silicone oil, e.g., DOW CORNING (R) 200 FLUID 50 CS (50 mPas dimethylpolysiloxane terminated with trimethylsilyl groups, carbon content of approximately 33%) (step a)). The resulting powder is conditioned at a temperature of more than 100° C. for half an hour, for example. The conditioning (step b) here. is conducted until the resulting material is wettable by water (methanol wettability <20; regarding the definition of methanol wettability see the measurement technique section), but which, when introduced into water no longer exhibits any separation between silica and silicone oil (if step c), follows directly on from step b), a methanol wettability >20 is preferred). Mixing of this masterbatch, (e.g., 50% by weight silica and 50% silicone oil) with aqueous silica dispersions or silica suspensions produces stable mixtures in which the silicone oil no longer separates from the silica. The total mixture typically contains one part by weight of silicone oil, about 4–8 parts by weight of silica, and 20–60 parts by weight of water. In order to prepare such a suspension, for example, the masterbatch (e.g., 50% silica and 50% silicone oil) can be mixed thoroughly with about 10–16 times the amount of filtercake (solids content approximately 20%) and about 10–20 times the amount of additional water. The advantage of this procedure is that the water-wettable masterbatch, which contains up to 75% of hydrophobic organopolysiloxane, can be dispersed directly in silica precipitation suspensions or silica feeds, very finely and stably, without the need to use emulsifiers or surfactants. After such a mixture has been dried, or filtered and then dried, the organopolysiloxane-containing silica thus obtained can be conditioned again (step b).

These steps can be carried out individually, where appropriate with milling beforehand. Milling should not, however, be conducted before coating a). It is also possible to carry out two or more of these variants, that is, identical or different variants in succession. The following embodiments of the process of the invention are conceivable:

One of steps a), b), and c) is performed a number of times (from 2 to 5 times) in succession.

Steps a) and b) are conducted a number of times (from 2 to 5 times) in succession.

All steps a), b), and c) are conducted a number of times (from 2 to 5 times) in succession; in other words, the process is run through a number of cycles.

Process step b) is preferably conducted by heat treatment at 100–150° C. over the course of from 0.5 to 2 hours. After conditioning, the partly hydrophobicized silica present may have a methanol wettability of 20% or more. Fundamentally, a distinction may be made between wet and dry hydrophobicization.

The definition of wet hydrophobicization is that the silicate starting materials are aqueous silica suspensions, silica feeds, or high water content silica filtercakes, which are coated with the corresponding hydrophobicizers, as described, for example, in DE 27 29 244 for precipitation suspensions with organohalosilanes.

The definition of dry hydrophobicization is that the silicate starting materials are silica powders with different moisture contents of from 1 to 75%, which are coated with the corresponding hydrophobicizers. This process is described, for example, in DE 26 28 975.

The silica of the invention is prepared using organopolysiloxane compounds. It is, however, also possible to use other silicone compounds which react to give organopolysiloxanes under the selected reaction conditions, for example, dichlorodimethylsilane in an aqueous environment.

Suitable hydrophobicizing agents employed in the invention include organo-polysiloxane compounds or their precursors, for example, those with the composition $R_{4-n}SiX_n$, wherein n=1, 2 or 3; $[SiR_xX_yO]_z$, wherein $0 \leq x \leq 2$, $0 \leq y \leq 2$, $3 \leq z \leq 10$ and x+y=2; $[SiR_xX_yN]_z$, wherein $0 \leq x \leq 2$, $0 \leq y \leq 2$, $3 \leq z \leq 10$ and x+y=2; $SiR_nX_mOSiR_oX_p$, wherein $0 \leq n \leq 3$, $0 \leq m \leq 3$, $0 \leq o \leq 3$, $0 \leq p \leq 3$, n+m=3 and o+p=3; $SiR_nX_mNSiR_oX_p$, wherein $0 \leq n \leq 3$, $0 \leq o \leq 3$, $0 \leq m \leq 3$, $0 \leq p \leq 3$ and n+m=3, o+p=3; $SiR_nX_m[SiR_xX_yO]_zSiR_oX_p$, wherein $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10,000$, n+m=3, x+y=2 and o+p=3). These compounds may be linear, cyclic, and branched silane, silazane and siloxane compounds. R may comprise alkyl and/or aryl radicals, which may be substituted by functional groups such as the hydroxyl group, the amino group, polyethers such as ethylene oxide and/or propylene oxide, and halide groups such as fluoride. R may also contain groups such as hydroxyl, amino, halide, alkoxy, alkenyl, alkynyl, and allyl groups, and groups containing sulfur. X may comprise reactive groups such as silanol, amino, mercapto, halide, alkoxy, alkenyl, and hydride groups.

Preference is given to linear polysiloxanes having the composition $SiR_nX_m[SiR_xX_yO]_zSiR_oX_p$, wherein $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10,000$, n+m=3, x+y=2 and o+p=3, in which R is preferably represented by methyl.

Particular preference is given to polysiloxanes having the composition $SiR_nX_m[SiR_xX_yO]_zSiR_oX_p$, wherein $0 \leq n \leq 3$, $0 \leq m \leq 1$, $0 \leq x \leq 2$, $0 \leq y \leq 0.2$, $0 \leq o \leq 3$, $0 \leq p \leq 3$, $1 \leq z \leq 1,000$, n+m=3, x+y=2 and o+p=3, in which R is preferably represented by methyl. It is also possible, however, to use polysiloxanes of low volatility which contain no functional groups in the process of the invention.

Because of the presence of certain functional groups in polysiloxane compounds, salts or low molecular weight substances such as $NH_3$, amines, alcohols, and the like may be formed, which can lead to disruptive impurities. An important exception here is constituted by silanol-functionalized polysiloxanes, since the only impurity formed here is water, which is easy to remove under the selected process conditions.

With preference, the hydrophobicizer may comprise a methyl-terminated polydimethylsiloxane, in particular one having a viscosity of 30–100 in mPas, preferably 40–60 mPas. An example of a suitable polysiloxane oil is DOW CORNING (R) 200 FLUID 50 CS.

Since the aforementioned hydrophobicizers are compounds of low volatility, an important part in the initial distribution of the hydrophobicizers on the silica surface is played by capillary forces and diffusion events at the liquid/solid phase boundary.

Even if the hydrophobicizers of preference exhibit a certain volatility in the course of thermal treatment, the liquid/solid distribution is still important. For this reason, a distinction is made here between physical, initial distribution, conditioning, and heat treatment.

The heat treatment, i.e., process step c), is conducted at a temperature of at least 300° C., preferably above 350° C., with very particular preference above 360–370° C., with an oxidizing gas. Suitable gases for use in the process include air, $Cl_2$, $NO_x$ ($NO_2$, $N_2O_5$, NO, $N_2O$), $O_3$, $O_2$, $Br_2$, $F_2$, or mixture of these gases with another inert gas such as $CO_2$, $N_2$ or burner waste gases, in each case preferably at not less than 1% by volume.

Additionally, the oxidizing gas may optionally contain up to 80%, preferably up to 50%, with particular preference 20–40%, by volume of water.

In every case, a good gas throughput must be ensured; as far as possible, the gas must reach every silica particle. This is achieved by the fluidic conditions in the process of the invention.

Fluidic conditions such as, for example, fluidized layers or a fluid bed in accordance with the definition in Römpp Lexikon Chemie, 2nd edition, 1999, can be set, for example, in a suspended bed, moving bed, fluidized bed and/or turbulent bed.

It is possible to combine two or more of these types of reaction. The process may be operated batchwise or continuously.

By way of example, the text below gives further details of the conditions in a fluidized bed reactor.

Heat Treatment in a Fluidized Bed:

Heat treatment of the polysiloxane-treated silica under oxidizing, i.e., bleaching reaction conditions, can be conducted in a fluidized bed in the presence of oxygen. Since precipitated silica powders, including polysiloxane-treated silicas, are typically readily free-flowing and fluidizable, they can easily be heat-treated in a fluidized bed. The decisive advantages of the fluidized bed reactor lie in the homogeneous distribution of material and of temperature in the fluidized bed reactor. Even in the case of predominant wall heating and temperatures above 300° C., wall temperature and product temperature differ by only a few degrees (typically only 2–4° C.) because an active fluidized bed, i.e., a fluidized bed operated at above its fluidization point, exhibits optimum thermal conductivity.

With conventional wall-heated reactor types—or with types of reactors in which the heating rods contact the product directly—this homogeneous temperature distribution is difficult to realize in the case of a thermally insulating product such as silica. Particularly in the case of reactor types with heating rods, or when it is attempted to heat the silica from room temperature to more than 300° C. in less than 0.5 h, instances of severe local overheating may occur. In such cases the oxidizing gas, oxygen for example, no longer has a bleaching effect but instead has a carbonizing and thus a discoloring effect. Conventional reactors normally house a stirrer mechanism in order to achieve more homogeneous distribution of materials and temperature. Because silica possesses abrasive properties, metal abrasion can occur in this case and leads to discoloration of the silica.

In fluidized bed reactors, silicas can be heat treated without disruptive metal abrasion being in evidence.

The homogeneous distribution of materials and distribution of temperature make it possible to conduct heat treatment at relatively low process gas throughputs (0.5–5 m³/[h·kg]. This leads to relatively high concentrations of elimination products and hence to effective hydrophobicization by the elimination products) and, for example, oxygen contents of 4–7% by volume. In this case the concentration range in which the oxygen exhibits its bleaching action extends close to the critical oxygen concentration of the explosion limit of the oxygen/silicone oil elimination products mixture. If distribution is not homogeneous, local excess oxygen may lead locally to an ignitable mixture and thus to explosion. With the fluidized bed, the desired process conditions can be maintained safely. Furthermore, in the fluidized bed it is possible to realize even very high process gas throughputs (up to 50 m³/[h·kg]). These high gas throughputs allow a safe heat treatment even at oxygen concentrations of more than 10% oxygen content.

The heat treatments are preferably conducted with relatively low process gas throughputs (0.5–5 m³/[h·kg]) at oxygen contents of 4–7% by volume. This leads to relatively high elimination product concentrations (thus guaranteeing effective hydrophobicization via the gas phase), while nevertheless allowing excess elimination products to be discharged. At these oxygen concentrations, the elimination products are almost—but not completely—free of discoloration and must therefore be expelled as completely as possible.

Heat treatment of the silica powder in the fluidized bed reactor can be conducted batchwise or continuously. In continuous operation, the reactor should be operated in such a way that the fraction of silica particles exposed to the operating temperature for less than 15 minutes is as small as possible. This can be done, for example, by means of an appropriate arrangement of weirs. The preferred heat treatment times are 0.25–4 h at temperatures of 330–400° C.

The reactor size may range from laboratory scale (100 g range/charge) via pilot plant size (100 kg range/charge) through production scale (>100 kg/charge).

This type of reactor has the advantage that it can be operated with average particle sizes of 5–500 μm. This means that it is not absolutely necessary here to employ a grinding operation following the heat treatment.

Following the conditioning step and/or heat treatment, the hydrophobicized silica can be in all cases ground. Milling before the coating step a), however, is not appropriate, and leads to low-grade products with inhomogeneous hydrophobicization.

Optional milling gives a silica having a $d_{4,3}$ of 8–25 μm, preferably 8–15 μm.

The use of the precipitated silicas prepared in accordance with the invention as a filler in silicone rubber formulations, as defoamer auxiliaries or as free-flow auxiliaries is likewise provided by this invention.

In order to fully develop the mechanical properties of silicone rubber formulations, the formulations require active reinforcing fillers. It is common to use highly dispersed silicas. Because of the ease of mechanical processing of LSR (liquid silicone rubber) formulations, especially in injection molding processes, HTV (high temperature vulcanizing) silicone rubber formulations are increasingly being replaced by LSR mixtures. The reinforcing filler must bring about good mechanical properties in the vulcanizate without impairing the rheological properties of the silicone rubber formulations. After compounding, the silicone rubber formulations must be flowable and should not undergo after stiffening even following prolonged storage times.

HTV and LSR formulations are processed at temperatures well above 100° C. At such temperatures, hydrous fillers may lead to disruptive formation of vapor bubbles in the silicone formulation. In the case of silicone rubber formulations which cure by atmospheric humidity, an excessively high water content in the filler results in unwanted curing in the course of storage. Accordingly, the water absorption characteristics, i.e., the amounts of water adsorbed at different relative atmospheric humidities, constitutes a measure of the processability of the filler.

The problem of vapor bubble formation occurs particularly with the hydrophilic precipitated silicas. Even hydrophobic precipitated silicas do not, typically, exhibit the low water absorption characteristics of the pyrogenic silicas.

The hydrophobic precipitated silica prepared by the process of the invention, however, exhibits water absorption characteristics comparable with those of fumed silicas, is unaffected by discoloration, and also has low-thickening properties in silicone rubber formulations.

These properties are derived from the nature of the base silica used and from the nature of the hydrophobicization. The base silica is preferably a precipitated silica which has a very low silanol group density (The measure of the silanol group density is the Sears number taken together with the BET surface area). The low silanol group density of the base silica is also manifested in a low loss on ignition of 3.0±0.5 at a BET surface area of about 160 $m^2/g$.

For silicone rubber mixtures which are processed at temperatures of almost 200° C. with ingress of air, it is important that there are no organic constituents on the silica which might undergo discoloration under the influence of oxygen at these temperatures. Organosilicon compounds containing exclusively methyl, phenyl, fluorocarbon or hydrofluorocarbons as organic radicals are extremely temperature-stable even in the presence of atmospheric oxygen. In order, however, to achieve effective cleavage of the stable siloxane bridges of siloxane compounds and to bond them covalently to the silica, temperatures above 300° C. are required. At these high temperatures, siloxane compounds, especially in the case of precipitated silicas with a low silanol group density, normally lead to discoloration phenomena on the silica. The process of the invention makes it possible to suppress this discoloration These discoloration phenomena are measured by reflectance measurements with an optical measurement technique based on diffuse reflection. Where the reflectances of silica are >94%, the silica-filled silicone rubber compound appears pure white. Since the refractive indices of silica and silicone rubber are close to one another, even very small impurities and discolorations in the silica filler become clearly visible in the silicone rubber. A reflectance of 93% already leads to a marked discoloration in the silicone rubber, visible with the naked eye, despite the fact that the silica powder before incorporation appears pure white to the viewer.

By mixing the silica with diorganopolysiloxanes and, where appropriate, further substances at room temperature or only slightly elevated temperature, it is possible to prepare compositions which can be cured to give elastomers, following the addition of crosslinking agents where appropriate. The silica of the invention has a low thickening effect, so that the compounds can be processed in LSR systems on injection molding machines. Mixing can be conducted conventionally, in mechanical mixers, for example.

The silicas are employed preferably in amounts ranging from 5 to 50% by weight, more preferably from 10 to 40% by weight, based on the overall weight of the compositions which can be cured to give elastomers. In the case of HTV organopolysiloxane elastomers it is possible to use up to 50% by weight.

Besides diorganopolysiloxanes, the hydrophobicized precipitated silica, crosslinking agents and crosslinking catalysts, the compositions which can be cured to elastomers may of course, where appropriate, include fillers which are conventionally, often or usually, used in compositions that can be cured to elastomers. Examples of such substances are fillers having a surface area of less than 50 $m^2/g$, such as quartz flour, diatomaceous earth, and also zirconium silicate and calcium carbonate, and also untreated fumed silica, organic resins, such as polyvinyl chloride powders, organopolysiloxane resins, fibrous fillers, such as asbestos, glass fibers and organic pigments, soluble dyes, fragrances, corrosion inhibitors, agents which stabilize the compositions against the influence of water, such as acetic anhydride, agents which retard curing, such as benzotriazol, and plasticizers, and also trimethylsiloxy-endblocked dimethylpolysiloxanes.

The cited combination of physicochemical characteristics of the hydrophobic precipitated silica prepared by the process of the invention results in an outstanding reinforcing filler. The equilibrium moisture content, much lower than that of the precipitated silicas prepared by known processes, brings advantages in processing, in the context, for example, of vulcanization at atmospheric pressure, which produces pore-free vulcanizates in comparison with the use of the known, hydrated precipitated silicas. The optimized pH and the low DBP number lead to perceptibly reduced roller-softening times. The low electrolyte content in combination with the low moisture content leads ultimately to good electrical properties in the vulcanizates. In silicone rubber sealants that cure by atmospheric humidity, the low water content of the hydrophobic precipitated silica of the invention gives advantages for the storage properties of the uncured sealants.

Having generally described this invention, a further understanding can be obtained by reference to certain specific examples which are provided herein for purposes of illustration only and are not intended to be limiting unless otherwise specified.

EXAMPLES

As the silicate starting material, it is preferred to use precipitated silicas which possess a very low silanol group density, i.e., a low alkali consumption/BET surface area ratio, a relatively high CTAB surface area for approximately the same BET surface area, and a high level of whiteness and purity.

General Description of a Preparation of a Suitable Silica

Aqueous sodium silicate solution (waterglass), and sulfuric acid is added with stirring into a reaction vessel pre-charged with water. During the addition, an alkaline pH is maintained. The silica precipitates from the reaction mixture, which is then acidified to pH 2–5 and filtered. The solid product is washed with water and dried.

Any silica with the following properties is suitable as starting material for the hydrophobic process according to the invention.

| | |
|---|---|
| BET surface area ($m^2/g$) | 50–170 |
| CTAB surface area ($m^2/g$) | 50–170 |
| Loss on ignition based on the substance | |
| Dried 2 h/105° C. (DIN 55921) (%) | ≦3.5% |
| pH 5% (methanol/aqueous solution) (DIN 53200) | 5–9 |
| Conductivity (in 5% aqueous dispersion) (μm) | <500 μS |
| Tapped density | >200 g/l |
| Sears Number | <13 |

The base silica and the polysiloxane are mixed until a defined carbon content is obtained; in other words, the mixing ratio is a function of the arithmetic proportion for setting the required carbon content.

1. Measurement Techniques 1.1 Methanol Wettability

Silicas whose surfaces have been modified with nonhydrolyzable organic groups are usually not wetted by water.

These hydrophobic silicas can, however, be wetted by a methanol/water mixture. The fraction of methanol in this mixture—expressed as a percentage by weight—is a measure of the hydrophobicity of modified silica. The higher the methanol fraction, the better the hydrophobicization of the substance.

Procedure

A 200 mg amount of each hydrophobic silica or silicate sample is weighed into 6 centrifuge tubes each with a capacity of 15 ml, and each of the tubes is filled with 8 ml of a methanol/water mixture of ascending methanol concentration. The methanol concentration of the mixtures is guided by the anticipated methanol wettability. The centrifuge tubes are tightly sealed and then shaken vigorously (10 up-and-down motions). To separate the wetted silica/silicate fractions, the tubes are then centrifuged at 2,500 rpm for 5 minutes. The wetted fractions form a sediment whose volume can be read on the scale on the centrifuge tubes. On a graph, the sediment volumes are plotted against the methanol/water mixture concentration. These individual points produce a curve whose position and steepness characterizes the degree of hydrophobicization of the sample under analysis.

Apparatus: Precision balance

Centrifuge

Centrifuge tubes, graduated

Dispensettes 1.2 DBP Absorption

The DBP absorption (DBP number), which is a measure of the absorbency of the precipitated silica, is determined as follows:

The dibutyl phthalate number is determined using the Brabender plastograph. The DBP number is a measure of the absorbency of a pulverulent product for liquid. The absorbency is dependent on the moisture content, the particle size, and the amount of material analyzed.

Apparatus and Reagents

Brabender plastograph with plotter

Multi-Dosimat E 415 (50 1) from Metrohm

Dibutyl phthalate

Procedure

A 12.5 g amount of silica is introduced into the kneader of the Brabender plastograph. With continued mixing (kneader paddle speed 125 rpm), dibutyl phthalate runs into the mixture at a rate of 4 ml/minute. The force required for incorporation is low. Toward the end of the determination, the mixture becomes poorly free-flowing. This fact is documented by an increase in the force required to knead the silica/ DBP mixture, which is indicated on the scale. When the scale has moved by 300, DBP metering is automatically shut off.

Evaluation

The density of DBP is 1.047 g/ml. The DBP absorption is based on the anhydrous, dried substance. When using precipitated silicas of relatively high moisture content, the value must be corrected using the following table if these silicas are not dried prior to the determination of the DBP number.

Correction table for dibutyl phthalate absorption—anhydrous

| % water | % water | | | | |
|---|---|---|---|---|---|
| % water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

The correction figure corresponding to the water content is added to the experimentally determined DBP value; for example, a water content of 5.8% would mean an add-on of 33 g/100 g for the DBP absorption.

1.3 Particle Size

The particle size is determined using a Malvern Mastersizer in ethanol following ultrasound treatment for 5 minutes. The measurement is made automatically and provides the average particle size $d_{4,3}$ from a volume distribution.

1.4 Determination of the Tristimulus Value $R_y$ in Accordance with DIN 5033

Application

Using the Datacolor 3890 spectrophotometer, the tristimulus value $R_y$ is determined for silicas, silicates, and zeolites (powder suspensions).

Analytical Procedure:

The silica to be analyzed is first ground to an average particle diameter of about 8 to 15 μm and then pressed to a tablet using a powder press. The amount required depends on the fineness of the powder. The amount of powder introduced is such that the thread of the press closure reaches its last turn.

The samples are placed under the meter, and whiteness measurements $R_y$ and $R_{460}$ are selected from the menu of the control computer. After the sample designation has been entered, the space key is operated in order to start the measurement.

Following entry of the memory code, the measurements are printed.

The values are calculated automatically in accordance with the following formula:

$$Y = \sum_{400}^{700} S*(\lambda)*Y(\lambda)*R(\lambda)$$

where $Y(\lambda)$ is the standard distribution coefficient, $S(\lambda)$ is the relative spectral radiation distribution of the illumination source, and $R(\lambda)$ is the spectral reflectance of the sample.

1.5 Determination of the Sears Number of Silicas, Silicates and Hydrophobic Silicas 1. Application Free OH groups are detectable by titration with 0.1 N KOH in the range from pH 6 to pH 9.

2. Apparatus 2.1 Precision balance accurate to 0.01 g
2.2 Memotitrator DL 70, Mettler, equipped with 10 ml and 20 ml Bürette, 1 pH electrode and 1 pump (e.g., NOUVAG pump, type SP 40/6)
2.3 Printer
2.4 Titration vessel 250 ml, Mettler
2.5 Ultra-Turrax 8000–24000 rpm
2.6 Thermostated waterbath
2.7 2 dispensers 10–100 ml for metering methanol and deionized water
2.8 1 dispenser 10–50 ml for metering deionized water
2.9 1 measuring cylinder 100 ml
2.10 IKA universal mill M 20

3 Reagents 3.1 Methanol p.A.
3.2 Sodium chloride solution (250 g NaCl p.A. in 1,000 ml deionized water)
3.3 0.1 N hydrochloric acid
3.4 0.1 N potassium hydroxide solution
3.5 Deionized water
3.6 Buffer solutions pH 7 and pH 9

4. Procedure 4.1 Sample preparation

Mill about 10 g of sample for 60 seconds in the IKA universal mill M 20.

Important: Since only very finely ground samples give reproducible results, these conditions must be strictly observed.

4.2 Analytical procedure 4.2.1 Weigh out 2.50 g of the sample prepared in accordance with section 4.1 into a 250 ml titration vessel.
4.2.2 Add 60 ml of methanol p.A.
4.2.3 After complete wetting of the sample, add 40 ml of deionized water
4.2.4 Disperse for 30 seconds using the Ultra-Turrax at a speed of about 18,000 rpm
4.2.5 Rinse particles of sample adhering to the vessel edge and stirrer into the suspension using 100 ml of deionized water
4.2.6 Condition sample to 25° C. in a thermostated waterbath (for at least 20 minutes)
4.2.7 Calibrate pH electrode with the buffer solutions pH 7 and pH 9
4.2.8 The sample is titrated in the Memotitrator DL 70 in accordance with method S 911. If the course of titration is indistinct, a duplicate determination is conducted subsequently.

The printed results obtained as follows:
pH
$V_1$ in ml/5 g
$V_2$ in ml/5 g

5. Calculation $$V_1 = \text{ml KOH or ml} \quad \begin{aligned} V_1 &= \frac{V*5}{E} \\ V_2 &= \frac{V*5}{E} \end{aligned}$$

HCl to pH6/5 g of substance
$V_2$=ml KOH consumed to pH9/5 g of substance
E=initial mass Principle First of all the initial pH of the suspension is measured, then according to the result the pH is adjusted to 6 using KOH or HCl. Then 20 ml of NaCl solution are metered in. The titration is then continued to a pH of 9 using 0.1 N KOH.

Sears numbers

Si—OH+NaCl→Si—ONa+HCl

HCl+KOH→KCl+$H_2O$

1.6 Determination of the Tamped Density in Accordance with DIN/ISO 787/11

Procedure

A 10 g amount of the sample under analysis is weighed accurately to 0.01 g on the precision balance, and is introduced into the graduated 250 ml glass cylinder of the jolting volumeter. After 1250 jolts, the volume of the tapped material is read.

Calculation:
Tapped density:

$$g/l = \frac{E \cdot 1000}{I}$$

E=initial wright in g
I=volume in ml

Apparatus:

| | |
|---|---|
| Precision balance | Engelsmann, Ludwigshafen |
| Jolting volumeter 250 ml glass cylinder, graduated | Engelsmann, Ludwigshafen |

Remarks:

In special cases, the material may be passed through a 500 μm sieve before weighing, or the initial mass may be increased. This must be specified in a test report.

1.7 Determination of CTAB Surface Area

1. Application

The method is based on the adsorption of CTAB (N-cetyl-N,N,N-trimethylammonium bromide) on the "external" surface, which is also referred to as the "rubber-active surface".

The adsorption of CTAB takes place in aqueous solution at pH=9 with stirring and ultrasound treatment. Excess, unadsorbed CTAB is determined by back-titration with SDSS (dioctylsodium sulfosuccinate solution) using a titroprocessor, the endpoint being given by the maximum clouding of the solution and determined using a photodiode.

For the calculation, an occupancy of 0.35 nm² per CTAB molecule is assumed.

The determination is made in accordance with ASTM 3765.

With each measurement series, a standard sample of type VN 3 silica should be tested as well.

2. Reaction Equation: (back-titration)

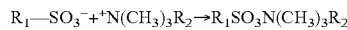

NDSS  CTAB

3. Apparatus
  3.1 Mill, e.g. IKA, type: M 20
  3.2 Analytical balance
  3.3 Magnetic stirrer
  3.4 Magnetic stirrer rod
  3.5 Titroprocessor, e.g., METTLER, type DL 55 or DL 70, equipped with: pH electrode, e.g., Mettler, type DG 111 phototrode, e.g. Mettler, type DP 550, and burette, 20 ml volume, for SDSS solution, burette, 10 ml volume, for 0.1 N KOH
  3.6 titration beakers, 100 ml, made of polypropylene
  3.7 glass titration vessel, 150 ml volume, closable with snap-on lid
  3.8 conical flasks, 100 ml volume, closable with screw lid or NS stopper
  3.9 ultrasound bath
  3.10 pressure filtration device
  3.11 membrane filter of cellulose nitrate, pore sizes of 0.1 μm, 47 mm ø, e.g., Sartorius type 113 58
  3.12 pipettes, 5 ml, 100 ml 4. Reagents
  4.1 Potassium hydroxide solution, 0.1 N
  4.2 CTAB solution, 0.0151 mol/l 5.50 g of CTAB are dissolved with stirring (magnetic stirrer) in about 800 ml of warm (about 30–40° C.) demineralized water in a glass beaker, transferred to a 1 liter graduated flask, made up to the mark with demineralized water after cooling to 23–25° C., and transferred to a stock bottle.

Note:
  The solution must be stored and the measurement conducted at ≧23° C., since CTAB crystallizes out below this temperature. The solution should be prepared 10–14 days prior to use.

4.3 SDSS solution 0.00426 mol/l 1.895 g of SDSS (dioctylsodium sulfosuccinate) in a glass beaker are admixed with about 800 ml of demineralized water and the mixture is stirred with a magnetic stirrer until all of the material has dissolved. The solution is then transferred to a 1 liter graduated flask, made up to the mark with demineralized water, and transferred to a stock bottle.

SDSS solution readily undergoes biodegradation. The solution prepared should therefore be sealed well and should not be stored for more than 3 months. The concentration of the CTAB solution is assumed to be exact: 0.0151 mol/l. The concentration of the SDSS solution should be determined daily by means of a "blank" titration.

5. Procedure
  5.1 Blank titration (to determine the concentration of the SDSS solution)
  5.2 The consumption of SDSS solution for 5 ml of CTAB solution should be checked (blank value) 1× per day before each series of measurements 5.1.2 Pipette precisely 5 ml of CTAB solution into titration beakers
  5.1.3 Add about 50 ml of demineralized water
  5.1.4 Titrate with the titroprocessor until the end of titration Each blank titration should be performed as a duplicate determination; in the case where values do not agree, further titration should be conducted until the results are reproducible.

5.2 Adsorption
  5.2.1 The granulated and coarse samples are ground in a mill (the beater blade of the mill must be covered)
  5.2.2 Weight out exactly 500 mg of the ground sample on the analytical balance to a precision of 0.1 mg
  5.2.3 Transfer the sample amount weighed out quantitatively to a 150 ml titration vessel with magnetic stirrer rod
  5.2.4 Add exactly 100 ml of CTAB solution, seal titration vessel with lid, and stir on a magnetic stirrer for 15 minutes
  5.2.5 Screw the titration vessel onto the titroprocessor and adjust the pH of the suspension to 9.0±0.05 using KOH, 0.1 mol/l
  5.2.6 4-minute treatment of the suspension in the ultrasound bath
  5.2.7 Filtration through a pressure filter fitted with a membrane filter. During adsorption, it must be ensured that the temperature is held within the range from 23° C. to 25° C.

5.3 Titration
  5.3.1 Pipette 5 ml of filtrate (see section 5.2.7) into 100 ml titration beakers and make up to about 50 ml with demineralized water
  5.3.2 Screw titration beakers onto the titrator
  5.3.3 Carry out titration with SDSS solution in accordance with the defined measurement method, until clouding reaches a maximum. Each titration should be performed as a duplicate determination; in the case where values do not agree, further titration should be conducted until the results are reproducible.

6. Calculation $$m^2/g = (V_1 - V_2) * \frac{100 * E * 2 * 578.435}{V_1 * 1000}$$

$$V_1 \quad m^2/g = (V_1 + V_2) * \frac{115.687 * E}{V_1}$$

$$m^2/g = (V_1 + V_2) * \frac{115.687}{V_1} * 5.5$$

$V_1$=blank sample (ml of SDSS when using 5 ml of CTAB)
$V_2$=consumption (ml of SDSS when using 5 ml of filtrate)
E=initial weight g CTAB/l (5.5 g)
578.435=occupancy of 1 g of CTAB in m².

The measurement is normally to be given corrected to the anhydrous substance:

$$m^2/g = \frac{CTAB \, m^2/g * 100}{100 - \% \, H_2O}$$

Where the measured value for the standard sample differs by more than ±3 m²/g from the theoretical value, the entire measurement series must be repeated.

7. Notes
   re 1. In the literature, SDSS (dioctylsodium sulfosuccinate) is also called Aerosol OT. On samples with a pH>9, such as Extrusil, the pH is measured but not corrected, since the acid may alter the surface. Prior to beginning the titration, the phototrode is set to 1,000 mV, corresponding to a transparency of 100%.
   re 3. For measuring the different prescribed volumes of the CTAB solution, it is also possible to use dispensers or piston-stroke pipettes, provided they are regularly calibrated.
   re 4. The solutions indicated in sections 4.1 and 4.3 can also be purchased as ready-to-use solutions. The present supplier is Kraft, Duisburg.
      Telephone: 0203-58-3025.
      Order No. 6056.4 CTAb solution 0.0151 ml/l
      Order No. 6057.4 SDSS solution 0.00423 mol/l (in 2.5-liter glass bottles)
   re 5.2.4 Hydrophobic samples which are not wetted after stirring are to be dispersed carefully using an ULTRA-TURRAX before the pH is adjusted, in order to wet them.
   re 5.2.5 For adjusting the pH it is advisable to use a titrator. The titration is conducted in accordance with the endpoint method.
   re 5.2.7 For filtration, nitrogen from a gas bottle is used; an entry pressure of 4–6 bar is to be set.
   re 6. Should it be necessary to repeat a measurement series, it should be noted in particular that the pH meter used to set the pH must also be recalibrated.

1.8 Determination of Water Vapor Absorption (Water Vapor Isotherms)

To determine the water vapor absorption, the sample is exposed to different relative humidities at constant temperature (30° C.). The establishment of a constant weight is awaited.

To start with, completely dry air, i.e., air with a humidity of approximately zero, is used. After the equilibrium weight has been reached, this weight is chosen as the reference point; in other words, the water vapor absorption at a higher air humidity is expressed as the difference between the sample weight in completely dry air (following establishment of equilibrium) and the sample weight in humid air (following establishment of equilibrium). The humidity of the air is varied in steps of 10%.

In order to rule out hysteresis effects, both the water adsorption and the water vapor desorption are measured.

Preparation of Base Silica

A 50.0 m$^3$ amount of water is charged to a reaction vessel. Slowly, 9.2 m$^3$ of water glass solution and 0.9 m$^3$ of H$_2$SO$_4$ are added with stirring to the initial charge, an alkaline pH being maintained in the mixture during the addition. After the end of the addition of water glass and H$_2$SO$_4$, the pH of the resulting suspension is within the alkaline range. The suspension is acidified and filtered, and the solid product is washed with deionized water. The hydrophilic base silica can be dried, preferably by an accelerated drying method. The following data were obtained of the dried precipitated silica thus prepared.

| | |
|---|---|
| BET surface area [m$^2$/g] | 150–170 |
| CTAB surface area [m$^2$/g] | 150–170 |
| Loss on ignition based on the substance Dried 2 h/105° C. (DIN 55921) [%] | 3 ± 0.5 |
| pH 5% (methanol/aqueous solution) (DIN 53200) | 6–7 |
| Conductivity (in 5% aqueous dispersion) [µS] | <150 |
| Tapped density [g/l] | >250 |

Example 1

The drying and coating of the base silica with silicone oil (e.g., DOW CORNING (R) 200 FLUID 50 CS, carbon content about 33%, methyl-terminated silicone oil having a viscosity of 50 mPas) is conducted using a spin-flash dryer. The silica is then conditioned by aging at room temperature for at least 48 hours until it has a methanol wettability of at least 20%. The analytical data for the conditioned silica are given in Table 1.1.

TABLE 1.1

Analytical data of the conditioned silica

| | | |
|---|---|---|
| Water | % | 5.2 |
| pH | | 6.1 |
| Conductivity | µS | 41 |
| N$_2$ surface area | m$^2$/g | 84 |
| CTAB surface area | m$^2$/g | 132 |
| Tapped density | g/L | 317 |
| Alpine SR > 180 µm | % | 63 |
| Reflectance | % | 95.9 |
| C content | % | 4.12 |
| Methanol wettability | % | >20 |

The conditioned silica is heat treated in the fluidized bed at different oxygen contents. The experimental parameters are given in Table 1.2.

TABLE 1.2

Heat treatment in a fluidized bed at different oxygen contents:

| | Exp. 1 | Exp. 2 | Exp. 3 |
|---|---|---|---|
| Heat treatment time [min] | 60 | 60 | 60 |
| Product temperature [° C.] | 320–380 | 320–380 | 320–380 |
| Oxygen content [%] | 0–0.001 | 4.0–6.0 | 20–22 |
| C content before heat treatment | 4.12 | 4.12 | 4.12 |

The experiments show the correlation between oxygen content and discoloration. Only in the case of experiments 2 and 3 is a reflectance >94% achieved. In contrast to a silica from experiment 1, these silicas show no visible discoloration in silicone rubber. The analytical data for the oxidatively heat-treated precipitated silica are given in Table 1.3.

TABLE 1.3

Analysis:

| | Exp. 1 | Exp. 2 | Exp. 3 |
|---|---|---|---|
| MeOH wettability | 63 | 63 | 63 |
| C content after heat treatment | 3.96 | 3.47 | 3.39 |
| Reflectance | 92.8 | 94.5 | 94.9 |

The disclosure of German priority application Serial Number 101 38 491.2 filed Aug. 4, 2001 is hereby incorporated by reference into the present application.

Obviously, numerous modifications and variations of the present invention are possible in light of the above teach-

What is claimed as new and is intended to be secured by Letters Patent is:

1. A process for preparing hydrophobic precipitated silica, which comprises:
   a) preparing a mixture of an organopolysiloxane derivative and a precipitated silica;
   b) conditioning the mixture obtained at a temperature ranging from 10 to 150° C. for a period ranging from 0.5 to 72 h, and
   c) conducting oxidative heat treatment under fluid conditions at a temperature more than 300° C. with an oxidizing gas.

2. The process as claimed in claim 1, wherein, in a), the organopolysiloxane derivative is added to a precipitated silica having a water content ranging from 1.0 to 80% by weight.

3. The process as claimed in claim 1, wherein a) occurs by adding the organopolysiloxane derivative to a precipitated silica having a water content ranging from 70 to 99% by weight, with subsequent isolation of the solid from the water.

4. The process as claimed in claim 1, wherein a) occurs by simultaneously supplying a precipitated silica or hydrous precipitated silica and the organopolysiloxane derivative to a spin-flash drier.

5. The process as claimed in claim 1, wherein a) is conducted by mixing a precipitated silica with a ready-conditioned precipitated silica prepared according to a) and b).

6. The process as claimed in claim 1, wherein b) occurs by heat treatment at a temperature ranging from 100 to 150° C. for from 0.5 to 2 hours.

7. The process as claimed in claim 1, wherein b) occurs by storage at room temperature for at least 48 hours.

8. The process as claimed in claim 1, wherein the oxidizing gas comprises $Cl_2$, $NO_2$, $N_2O_5$, NO, $N_2O$, $O_3$, $O_2$, $Br_2$ and/or $F_2$.

9. The process as claimed in claim 8, wherein the oxidizing gas further comprises an inert gas.

10. The process as claimed in claim 9, wherein the amount of oxidizing gas in the inert gas is at least 1% by volume.

11. The process as claimed in claim 1, wherein the oxidizing gas is air or a mixture of air with inert gases.

12. The process as claimed in claim 1, wherein the oxidizing gas further contains up to 80% by volume of water.

13. The process as claimed in claim 1, wherein one of a), b), and c) is conducted a number of times in succession.

14. The process as claimed in claim 1, wherein a) and b) are conducted a number of times in succession.

15. The process as claimed in claim 1, wherein a), b), and c) are conducted a number of times in succession.

16. The process as claimed in claim 1, wherein the fluid conditions are set in a suspended bed, moving bed, fluidized bed and/or turbulent bed.

17. The process as claimed in claim 1, wherein the organopolysiloxane derivitive is selected from the group consisting of
   (ii) $[SiR_xX_yO]_z$, wherein $0 \leq x \leq 2$, $0 \leq y \leq 2$, $3 \leq z \leq 10$ and $x+y=2$;
   (iv) $SiR_nX_mOSiR_oX_p$, wherein $0 \leq n \leq 3$, $0 \leq m \leq 3$, $0 \leq o \leq 3$, $0 \leq p \leq 3$, $n+m=3$ and $o+p=3$; and
   (vi) $SiR_nX_m[SiR_xX_yO]_zSiR_oX_p$, wherein $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10,000$, $n+m=3$, $x+y=2$ and $o+p=3$, or the organopolysiloxane derivitive is produced from a precursor selected from the group consisting of
   (i) $R_{4-n}SiX_n$, wherein n=1, 2 or 3;
   (iii) $[SiR_xX_yN]_z$, wherein $0 \leq x \leq 2$, $0 \leq y \leq 2$, $3 \leq z \leq 10$ and $x+y=2$; an
   (v) $SiR_nX_mNSiR_oX_p$, wherein $0 \leq n \leq 3$, $0 \leq o \leq 3$, $0 \leq m \leq 3$, $0 \leq p \leq 3$ and $n+m=3$, $o+p=3$,
   wherein R comprises alkyl and/or aryl radicals, and
   wherein X comprises a reactive group.

18. The process as claimed in claim 17, wherein the organopolysiloxane derivative is $SiR_nX_m[SiR_xX_yO]_zSiR_oX_p$, wherein $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10,000$, $n+m=3$, $x+y=2$ and $o+p=3$, wherein R is methyl.

19. The process of claim 17, wherein X is selected from the group consisting of silanol, amino, mercapto, halide, alkoxy, alkenyl and hydride.

20. The process of claim 1, wherein the hydrophobic precipitated silica has the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m$^2$/g |
| CTAB surface area | >30 m$^2$/g |
| water vapor absorption at 30° C. and 30 ambient humidity | 1.1 ± 0.2% |
| water vapor absorption at 30° C. and 70 ambient humidity. | 1.4 ± 0.3% |

21. A hydrophobic precipitated silica prepared by the process according to claim 1.

22. The hydrophobic precipitated silica according to claim 21, which has the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m$^2$/g |
| CTAB surface area | >30 m$^2$/g |
| water vapor absorption at 30° C. and 30 ambient humidity | 1.1 ± 0.2% |
| water vapor absorption at 30° C. and 70 ambient humidity. | 1.4 ± 0.3% |

23. A process for preparing hydrophobic precipitated silica, which comprises:
   a) preparing a mixture of an organopolysiloxane derivative and a precipitated silica;
   b) conditioning the mixture obtained at a temperature ranging from 50 to 80° C. for a period ranging from 15 to 30 h, and
   c) conducting oxidative heat treatment under fluid conditions at a temperature more than 300° C. with an oxidizing gas to produce a hydrophobic precipitated silica.

24. The process of claim 23, wherein the hydrophobic precipitated silica has the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m$^2$/g |
| CTAB surface area | >30 m$^2$/g |
| water vapor absorption at 30° C. and 30 ambient humidity | 1.1 ± 0.2% |
| water vapor absorption at 30° C. and 70 ambient humidity. | 1.4 ± 0.3% |

25. A process for preparing hydrophobic precipitated silica, comprising:
   a) preparing a mixture of an organopolysiloxane derivative and a precipitated silica;
   b) conditioning the mixture obtained at a temperature ranging from 10 to 150° C. for a period ranging from 0.5 to 72 h, and
   c) conducting oxidative heat treatment under fluid conditions at a temperature of more than 300° C. with an oxidizing gas to produce a hydrophobic precipitated silica.

26. The process of claim 25, wherein the hydrophobic precipitated silica has the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m$^2$/g |
| CTAB surface area | >30 m$^2$/g |
| water vapor absorption at 30° C. and 30 ambient humidity | 1.1 ± 0.2% |
| water vapor absorption at 30° C. and 70 ambient humidity. | 1.4 ± 0.3% |

* * * * *